United States Patent [19]

Carolan et al.

[11] Patent Number: 5,240,473
[45] Date of Patent: Aug. 31, 1993

[54] PROCESS FOR RESTORING PERMEANCE OF AN OXYGEN-PERMEABLE ION TRANSPORT MEMBRANE UTILIZED TO RECOVER OXYGEN FROM AN OXYGEN-CONTAINING GASEOUS MIXTURE

[75] Inventors: Michael F. Carolan; Paul N. Dyer, both of Allentown; James M. LaBar, Sr., Tatamy; Robert M. Thorogood, Macungie, all of Pa.

[73] Assignee: Air Products and Chemicals, Inc., Allentown, Pa.

[21] Appl. No.: 937,766

[22] Filed: Sep. 1, 1992

[51] Int. Cl.$^5$ .................. B01D 53/22; B01D 71/02
[52] U.S. Cl. .................................. 95/54; 505/1; 505/701; 505/778; 505/785; 96/4
[58] Field of Search .............. 55/16, 68, 158, 523, 55/524; 505/1, 700, 701, 778, 785, 809

[56] References Cited

U.S. PATENT DOCUMENTS

| 5,108,465 | 4/1992 | Bauer et al. | 55/16 |
| 5,162,301 | 11/1992 | Reich et al. | 55/158 X |
| 5,169,415 | 12/1992 | Roettger et al. | 55/16 X |

FOREIGN PATENT DOCUMENTS

| 0362898 | 4/1990 | European Pat. Off. | 55/16 |
| 55-119420 | 9/1980 | Japan | 55/16 |
| 56-092103 | 7/1981 | Japan | 55/16 |
| 57-207533 | 12/1982 | Japan | 55/158 |
| 58-064258 | 4/1983 | Japan | 55/158 |
| 59-055314 | 3/1984 | Japan | 55/158 |
| 59-055315 | 3/1984 | Japan | 55/158 |
| 59-150508 | 8/1984 | Japan | 55/158 |
| 59-177117 | 10/1984 | Japan | 55/16 |
| 60-044003 | 3/1985 | Japan | 55/158 |
| 60-051502 | 3/1985 | Japan | 55/158 |
| 61-002548 | 1/1986 | Japan | 55/158 |
| 61-238303 | 10/1986 | Japan | 55/158 |
| 63-156515 | 6/1988 | Japan | 55/158 |
| 63-156516 | 6/1988 | Japan | 55/158 |
| 1-219001 | 9/1989 | Japan | 55/16 |
| 1-310714 | 12/1989 | Japan | 55/158 |
| 0604826 | 9/1978 | Switzerland | 55/16 |

OTHER PUBLICATIONS

E. A. Cooper, et al. J. Mater. Res. 6 (1991) 1393.
Y. Gao, et al., J. Meter. Res. 5 (1990) 1363.

Primary Examiner—Robert Spitzer
Attorney, Agent, or Firm—Keith D. Gourley; James C. Simmons; William F. Marsh

[57] ABSTRACT

This invention relates to a process for restoring permeance of an oxygen-permeable ion transport membrane utilized to recover oxygen from an oxygen-containing gaseous mixture which contains water, carbon dioxide or volatile hydrocarbons. The process utilizes a class of ion transport membranes formed from multicomponent metallic oxides wherein permeance of such membranes had been believed to be permanently degraded by water and the like under conventional process operating temperatures. This invention provides a continuous process for restoring oxygen permeance of such membranes caused by deleterious interaction between the membrane and components such as carbon dioxide, water or hydrocarbons at elevated process temperatures.

25 Claims, 3 Drawing Sheets

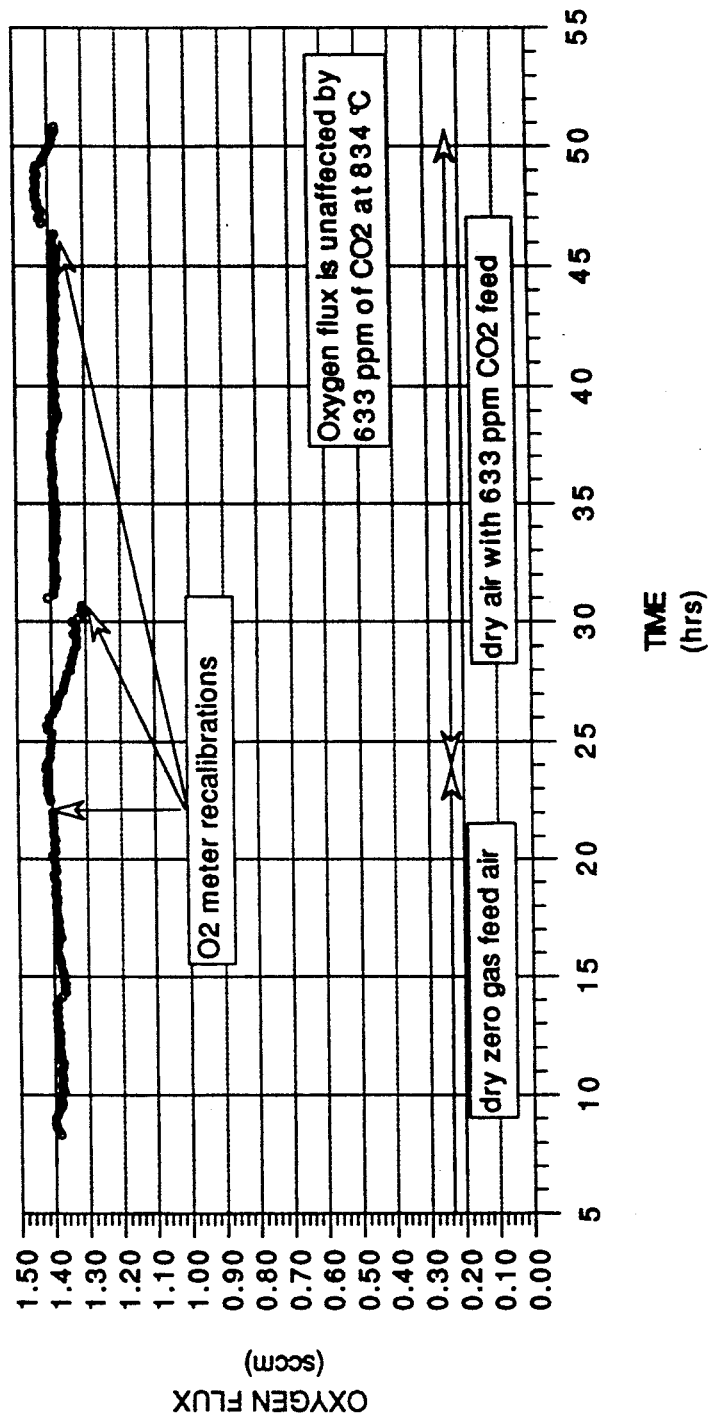

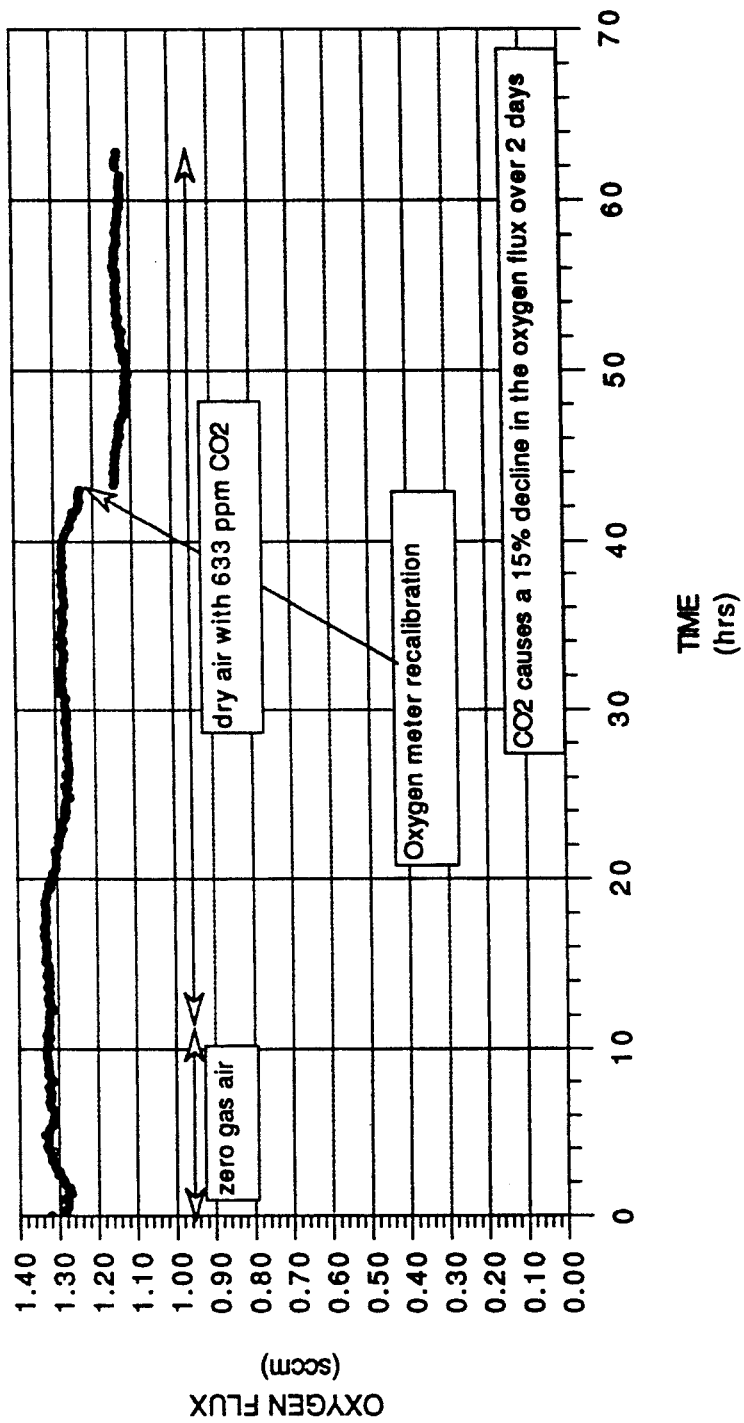

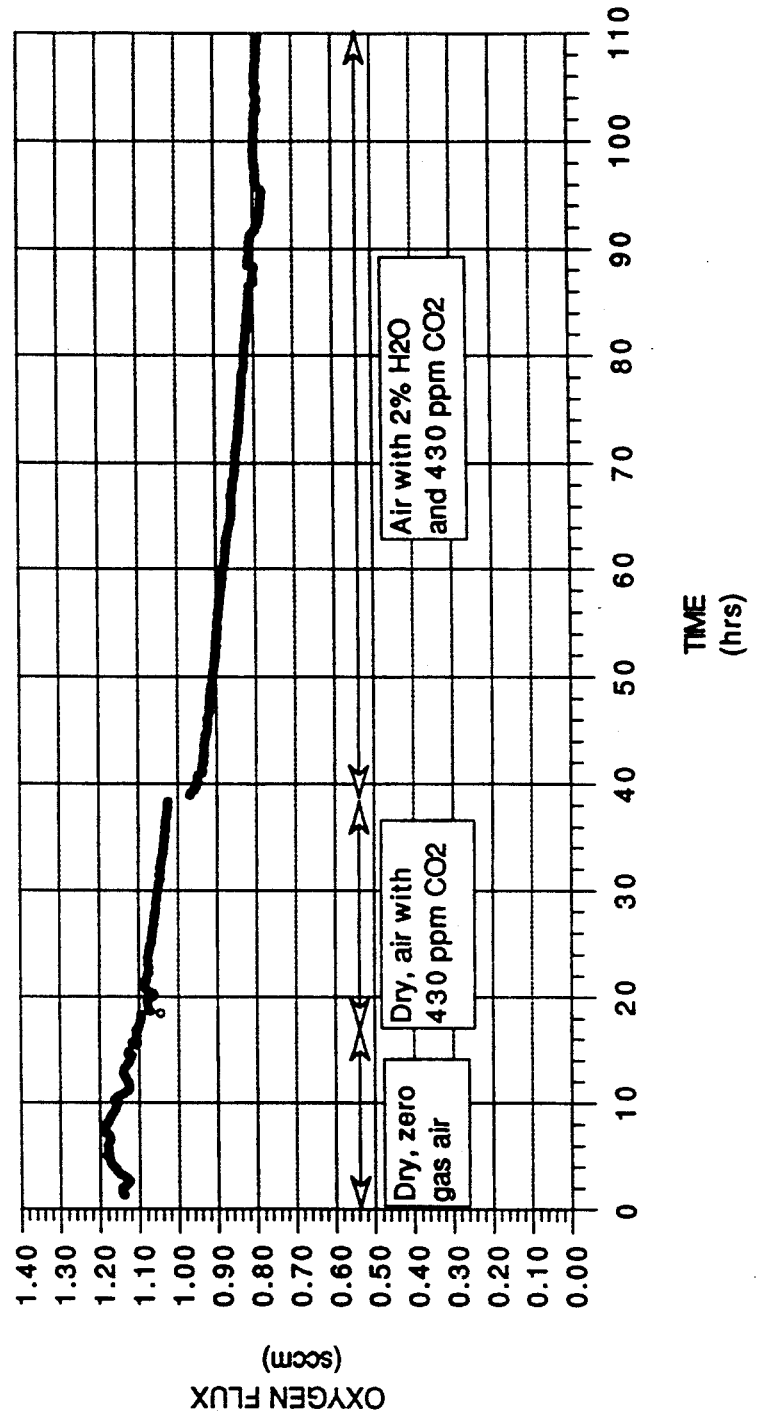

PROCESS FOR RESTORING PERMEANCE OF AN OXYGEN-PERMEABLE ION TRANSPORT MEMBRANE UTILIZED TO RECOVER OXYGEN FROM AN OXYGEN-CONTAINING GASEOUS MIXTURE

FIELD OF THE INVENTION

This invention relates to a process for restoring permeance of an oxygen-permeable ion transport membrane utilized to recover oxygen from an oxygen-containing gaseous mixture which contains water, carbon dioxide or volatile hydrocarbons. The process utilizes a class of ion transport membranes formed from multicomponent metallic oxides wherein permeance of such membranes had been believed to be permanently degraded by water and the like under conventional process operating temperatures. This invention provides a continuous process for restoring oxygen permeance of such membranes caused by interaction between the membrane and components such as carbon dioxide, water or hydrocarbons.

BACKGROUND OF THE INVENTION

Cryogenic distillation is currently the preferred process for producing high purity oxygen (>95%) in large scale plants (50–2000 ton/day). However, contaminants in the compressed air feed, i.e., water, carbon dioxide and trace hydrocarbons, must be removed before conducting the distillation process in order to prevent blocking of heat exchangers or distillation equipment and buildup of hazardous concentrations of hydrocarbons in the distillation column sump. Reversing heat exchangers are commonly employed to remove contaminants in the front end of the cryogenic plant wherein such contaminants are condensed in the exchanger passages and then removed with a waste gas stream. Alternately, absorbent beds containing zeolites or alumina which require periodic regeneration are used to absorb such contaminants. In addition, hydrocarbons must often be removed from the liquid oxygen sump by using an adsorbent such as silica gel. These methods lead to increased capital costs and inefficiencies in the overall separation processes.

Alternate methods for recovering oxygen from an oxygen-containing gaseous mixture include vacuum swing adsorption (VSA) and pressure swing adsorption (PSA) processes which employ selective adsorption of various components instead of conventional cryogenic steps to separate the mixture. As in the case of cryogenic processes, one or more of carbon dioxide, water and hydrocarbons must be separated from the feedstock prior to running the process to avoid deleterious interaction with the adsorbents.

Typical processes for removing carbon dioxide and water from an oxygen-containing gaseous mixture employ an adsorbent or desiccant and are capable of removing water vapor to very low levels, often to a dew point of less than −50° F. These processes possess a drawback in that the adsorbent bed must be regenerated, usually by purging the adsorbent bed with a low pressure dry waste gas or by using some portion of the product stream if a suitable waste gas stream is not available. Consequently, these systems are operated in a cyclic manner requiring duplication of equipment, operation of automated, timed switching valves and separate heater devices. An unavoidable loss of the gaseous feed often occurs during regeneration of the adsorbent.

U.S. Pat. No. 5,108,465 discloses a process for separating oxygen from an oxygen-containing gaseous mixture which comprises contacting the oxygen-containing gaseous mixture with a membrane which is impermeable to gas yet which is capable of conducting electrons and oxygen ions. The membranes are formed from a ceramic material selected from the group consisting of $BaFe_{0.5}Co_{0.5}YO_3$; yellow lead oxide; $ThO_2$; $Sm_2O_3$-doped $ThO_2$; $MoO_3$-doped $Bi_2O_3$; $Er_2O_3$-doped $Bi_2O_3$; $Gd_2Zr_2O_7$; $CaTi_{1-x}M_xO_{3-\alpha}$ wherein M is Fe, Co or Ni, x is 0–0.5 and $\alpha$ is 0–0.5; $SrCeO_3$; $YBa_2Cu_3O_{7-\beta}$ wherein $\beta$ is 0–1 and $(VO)_2P_2O_7$.

The ceramic materials disclosed in U.S. Pat. No. 5,108,465 comprise ionically conductive materials, which are commonly used in fabricating solid oxide fuel cell components, and superconducting materials. For example, $YBa_2Cu_3O_{7-\beta}$ is an ionically conductive superconducting material. However, barium-containing ceramic materials are well known to be adversely affected by the presence of carbon dioxide. For example, literature references teach that water and carbon dioxide will irreversibly degrade $YBa_2Cu_3O_7$ destroying superconductivity properties of the material upon contact with carbon dioxide at temperatures greater than about 400° C. This phenomena is discussed in numerous articles including those by E.A. Cooper et al., J. Mater. Res. 6 (1991) 1393 and Y. Gao et al., J. Mater. Res 5 (1990) 1363. Therefore, gas separation membranes formed from ceramic materials which are adversely affected by carbon dioxide, water or hydrocarbons have only been used to separate oxygen from oxygen-containing gaseous mixtures which are substantially free of the same. Consequently, one of ordinary skill in the art would be lead to believe that such processes would only be of only limited value in separating oxygen from atmospheric air which contains appreciable amounts of water, carbon dioxide and hydrocarbons.

Considerable effort is being expended in developing an oxygen recovery processes wherein the feedstock does not have to be pretreated to remove carbon dioxide, water or volatile hydrocarbons prior to conducting the separation. Moreover, improved processes are being sought wherein the ceramic membranes used to effect separation of oxygen from oxygen-containing gaseous mixtures can be regenerated periodically, if required, without stopping the process.

SUMMARY OF THE INVENTION

This invention relates to a process for recovering substantially pure oxygen from oxygen-containing gaseous mixtures containing water, carbon dioxide and volatile hydrocarbons. The process utilizes a class of ion transport membranes formed from multicomponent metallic oxides wherein permeance of such membranes has been heretofore deleteriously affected by such components. The invention provides a continuous process for restoring the diminished oxygen permeance of such membranes caused by interaction between the membrane and carbon dioxide, water and hydrocarbons at the elevated temperatures used to operate such air separation processes.

The process provides numerous advantages over prior art processes in that the oxygen-containing gaseous mixtures from which oxygen is to be separated do not have to be pretreated to remove water, carbon dioxide or volatile hydrocarbons prior to effecting the separation. Moreover, operating costs are substantially reduced by running the process at reduced temperatures until permeance decreases to an undesirable level at which time the process temperature is elevated for a limited time to restore membrane permeance. Unexpectedly, Applicants have discovered that degradation of permeance at elevated temperatures of the enumerated ion transport membranes caused by interaction of the membrane and carbon dioxide, water or hydrocarbons present in the oxygen-containing gaseous mixture can be substantially reversed by operating the process under the enumerated temperature cycles.

The process for restoring permeance of an ion transport membrane utilized to recover oxygen from an oxygen-containing gaseous mixture, which permeance has been diminished by adverse reaction with carbon dioxide and water present in the oxygen-containing gaseous mixture to be separated, comprises: (a) delivering the oxygen-containing gaseous mixture into a first gas compartment which is separated from a second gas compartment by an ion transport membrane comprising a multicomponent metallic oxide; (b) establishing a positive oxygen partial pressure difference between the first and second gas compartments by producing an excess oxygen partial pressure in the first gas compartment and/or by producing a reduced oxygen partial pressure in the second gas compartment; (c) contacting the oxygen-containing gaseous mixture with the ion transport membrane at a process temperature ranging from 650° C. to 800° C. to separate the compressed oxygen-containing gaseous mixture into an oxygen permeate stream and an oxygen-depleted gaseous stream and recovering the oxygen permeate stream until such time as the permeance drops to a predetermined value; (d) raising the process temperature to a temperature greater than about 810° C. for a period of time sufficient to restore membrane permeance to a second predetermined value; and (e) repeating steps (c) and (d).

The ion transport membranes suitable for practicing the claimed process comprise a multicomponent metallic oxide formed of at least two different metals or a mixture of at least two metal oxides. Preferred multicomponent oxides of the present invention demonstrate both electron conductivity as well as oxygen ion conductivity at elevated temperatures. Preferred multicomponent metallic oxide compositions are represented by $A_xA'_{x'}A''_{x''}B_yB'_{y'}B''_{y''}O_{3-z}$, where A and A'' are independently selected from the group consisting of the elements of Groups 1, 2 and 3 and the F block lanthanides; A' is selected from calcium, barium, strontium or magnesium and B, B' and B'' are chosen from the D block transition metals according to the Periodic Table of the Elements adopted by the IUPAC wherein $0 \leq x'' \leq 1$, $0 < x' \leq 1$, $0 \leq x \leq 1$, $0 < y \leq 1$, $0 \leq y' \leq 1$, $0 \leq y'' \leq 1, x+x'+x'' \leq 1$, $y+y'+y''=1$ and z is a number which renders the composition charge neutral.

BRIEF DESCRIPTION OF THE DRAWINGS

FIG. 1 is a plot of oxygen flux versus time observed during separation of oxygen from an oxygen-containing mixture using an ion transport membrane comprising $La_{0.2}Ba_{0.8}Co_{0.8}Fe_{0.2}O_{2.6}$ at 834° C.

FIG. 2 is a plot of oxygen flux versus time observed during separation of oxygen from an oxygen-containing mixture using an ion transport membrane comprising $La_{0.2}Ba_{0.8}Co_{0.8}Fe_{0.2}O_{2.6}$ at 808° C.

FIG. 3 is a plot of oxygen flux versus time observed during separation of oxygen from an oxygen-containing mixture using an ion transport membrane comprising $La_{0.2}Ba_{0.8}Co_{0.8}Fe_{0.2}O_{2.6}$ at 783° C.

DETAILED DESCRIPTION OF THE INVENTION

This invention presents Applicants' discovery that degradation of oxygen permeance of ion transport membranes formed from the enumerated class of multicomponent metallic oxides caused by reaction with carbon dioxide, water or hydrocarbons at elevated temperatures can be substantially reversed by operating the subject process in a cyclic manner under controlled temperature regimes.

As shall become evident, the process provides numerous advantages over prior art processes in that the oxygen-containing gaseous mixture from which oxygen is to be separated, does not have to be pretreated to remove components such as water, carbon dioxide or volatile hydrocarbons prior to effecting the separation. Moreover, operating costs are substantially reduced by running the process at reduced temperatures until permeance decreases to an undesirable level at which time the process temperature is elevated for a limited time to restore membrane permeance.

The process for restoring permeance of an ion transport membrane utilized to recover oxygen from an oxygen-containing gaseous mixture, which permeance has been diminished by adverse reaction with carbon dioxide and water present in the oxygen-containing gaseous mixture to be separated, comprises: (a) delivering the oxygen-containing gaseous mixture into a first gas compartment which is separated from a second gas compartment by an ion transport membrane comprising a multicomponent metallic oxide; (b) establishing a positive oxygen partial pressure difference between the first and second gas compartments by producing an excess oxygen partial pressure in the first gas compartment and/or by producing a reduced oxygen partial pressure in the second gas compartment; (c) contacting the oxygen-containing gaseous mixture with the ion transport membrane at a process temperature ranging from 650° C. to 800° C. to separate the compressed oxygen-containing gaseous mixture into an oxygen permeate stream and an oxygen-depleted gaseous stream and recovering the oxygen permeate stream until such time as the permeance drops to a predetermined value; (d) raising the process temperature to a temperature greater than about 810° C. for a period of time sufficient to restore membrane permeance to a second predetermined value; and (e) repeating steps (c) and (d).

Applicants' discovery that the diminished permeance over time of ion transport membranes, caused by interaction with carbon dioxide and water at conventional operating temperatures, can be periodically restored in a cyclic process, represents a significant breakthrough in gas separation processes. For example, barium-containing ceramic materials are well known to be adversely affected by the presence of carbon dioxide and/or water. Literature references teach that carbon dioxide will irreversibly degrade $YBa_2Cu_3O_{7-\beta}$ destroying superconductivity properties of the material upon contact with carbon dioxide at temperatures greater than about 400° C. This phenomena is discussed in numerous articles including those by E. A. Cooper et al., J. Mater. Res. 6 (1991) 1393 and Y. Gao et al., J. Mater. Res. 5 (1990) 1363.

The first step of Applicants' process comprises delivering an oxygen-containing gaseous mixture into contact with an ion transport membrane formed from a multicomponent metallic oxide wherein the membrane separates a first gas compartment and a second gas compartment. Any conventional apparatus can be utilized to house the ion transport membranes of the present invention whereby the membrane forms a partition between the first and second gas compartments. A representative apparatus is disclosed in U.S. Pat. No. 5,035,727, issued to Air Products and Chemicals, Allentown, Pa.

The ion transport membrane provides a gas-tight partition between the first and second gas compartments wherein the membrane is impervious to the components of the oxygen-containing gaseous mixture at ambient temperature. The ion transport membranes of the present invention comprise a multicomponent metallic oxide formed of at least two different metals or a mixture of at least two metal oxides. Preferred multicomponent metallic oxide demonstrate both electron conductivity as well as oxide ion conductivity at elevated temperatures and are referred to as mixed conductors.

Preferred multicomponent metallic oxides are represented by $A_xA'_{x'}A''_{x''}B_yB'_{y'}B''_{y''}O_{3-z}$, where A and A'' are independently selected from the group consisting of the elements of Groups 1, 2 and 3 and the F block lanthanides; A' is selected from calcium, barium, strontium or magnesium and B, B' and B'' are chosen from the D block transition metals according to the Periodic Table of the Elements adopted by the IUPAC wherein $0 \leq x'' \leq 1$, $0 < x' \leq 1$, $0 \leq x \leq 1$, $0 < y \leq 1$, $0 \leq y' \leq 1$, $0 \leq y'' \leq 1$, $x+x'+x''=1$, $y+y'+y''=1$ and z is a number which renders the composition charge neutral. Preferably, A' is selected from calcium, strontium or barium. Representative compositions include $La_{0.2}Ba_{0.8}Co_{0.8}Fe_{0.2}O_{3-z}$; $Pr_{0.2}Ba_{0.8}Co_{0.8}Fe_{0.2}O_{3-z}$; and $La_{0.2}Ba_{0.8}Co_{0.6}Cu_{0.2}Fe_{0.2}O_{3-z}$.

A self-supporting ion transport membrane of this invention can be prepared by compressing a sintered and ground powder of the desired multicomponent metallic oxide into the desired shape according to procedures known in the art. Care should be taken to ensure that the membrane is free from cracks and through-porosity which would greatly diminish or destroy the selectivity achieved by the process. The membranes can also be fabricated by slip or tape casting and injection molding processes according to procedures known in the art.

In a preferred embodiment, a thin layer of the multicomponent metallic oxide is deposited onto a porous support. Use of a porous substrate for receiving the multicomponent metallic oxide greatly improves the mechanical stability of the resulting ion transport membrane. A wide variety of porous substrates are capable of receiving the enumerated multicomponent metallic oxides. Such porous substrates possess a network of pores such that a gas can penetrate through the substrate (i.e., through-porosity). Therefore, the term, porous substrate, does not refer to materials which merely possess surface or closed internal porosity.

Suitable porous substrates include metal oxide-stabilized zirconia such as yttria-stabilized zirconia and calcium-stabilized zirconia, alumina, magnesia, silica, titania, a high temperature oxygen compatible metal alloy, and compounds and mixtures thereof. Any combination of porous substrate and multicomponent metallic oxide can be utilized so long as their coefficients of thermal expansion are compatible and chemical reactions are minimized between the substrate and multicomponent metallic oxide at operating temperatures of the ion transport membrane. Thin layers of the desired multicomponent metallic oxide having a thickness ranging from 10 microns to about 0.1 microns in thickness can be deposited onto the enumerated porous substrate by known techniques such as chemical vapor deposition and the like. A preferred technique for manufacturing ultrathin inorganic membranes is presented in U.S. patent application Ser. No. 07/816,206, filed on Jan. 1, 1992, now U.S. Pat. No. 5,160,618, which is assigned to Air Products and Chemicals, Inc., Allentown, Pa.

Oxygen-containing gaseous mixtures containing one or more components selected from carbon dioxide, water and a volatile hydrocarbon which are capable of being separated according to the present process typically contain between about 10 vol. % to 50 vol. % oxygen. The preferred oxygen-containing gaseous mixture is atmospheric air. Representative hydrocarbons which will not adversely affect operation of this process include linear and branched alkanes, alkenes and alkynes having from 1 to about 6 carbon atoms and aromatics having from 6 to about 8 carbon atoms. Such hydrocarbons are believed to be converted to carbon dioxide and water under the process operating conditions thereby causing no adverse effect on the separation process.

If the multicomponent metallic oxide demonstrates both oxygen ionic and electronic conductivities, the oxide is said to be mixed conducting. Particularly useful for practical purposes are those in which the ionic and electronic conductivities are comparable or balanced. When fabricated in the form of a thin membrane, such oxides can be used to separate oxygen from an oxygen-containing gaseous mixture such as air by maintaining an oxygen partial pressure difference between the feed and permeate sides of the ion transport membrane, i.e., the first and second gas compartments. Examples of such materials are described in U.S. Pat. No. 4,330,633 and Japanese Patent Application 61-21717.

In the latter, the mixed conducting perovskite structure oxide $La_{1-x}Sr_xCo_{1-y}Fe_yO_{3-d}$ is mentioned, where x ranges from 0.1 to 1.0 and y from 0.05 to 1.0. Oxides of this type have an oxygen ionic conductivity of approximately $10^{-2}$ ohm$^{-1}$cm$^{-1}$ and an electronic conductivity of approximately $10^2$ ohm$^{-1}$cm$^{-1}$ at a temperature of about 800° C. When an oxygen-containing gaseous mixture at a higher partial pressure is applied to one side (the first gas compartment) of a 1-5 mm thick disc of multicomponent metallic oxide, oxygen will adsorb and dissociate on the surface, become ionized and diffuse through the solid and deionize, associate and desorb as a separated oxygen gas stream at the lower oxygen partial pressure surface (the second gas compartment).

The necessary circuit of electrons to supply this ionization/deionization process is maintained internally in the oxide via its electronic conductivity. This type of separation process is particularly suitable for separating oxygen from a gas stream containing a relatively high partial pressure of oxygen, i.e., greater than or equal to 0.2 atm. Multicomponent metallic oxides which demonstrate both oxygen ionic conductivity and electronic conductivity typically demonstrate an oxygen ionic conductivity ranging from 0.01 ohm$^{-1}$cm$^{-1}$ to 100 ohm$^{-1}$cm$^{-1}$ and an electronic conductivity ranging from about 1 ohm$^{-1}$cm$^{-1}$ to 100 ohm$^{-1}$cm$^{-1}$.

Some multicomponent metallic oxides are primarily or solely oxygen ionic conductors at elevated temperatures. An example is $(Y_2O_3)_{0.1}(Zr_2O_3)_{0.9}$ which has an oxygen ionic conductivity of 10 ohm$^{-1}$cm$^{-1}$ at 1000° C. and an ionic transport number (the ratio of the ionic conductivity to the total conductivity) close to 1. A multicomponent oxide of this type can be used to separate oxygen in one of two ways. European Patent Application EP 0399833A1 describes a membrane formed from a composite of this oxide with a separate electronically conducting phase, such as platinum or another noble metal. The electronic conducting phase will provide the return supply of electrons through the structure allowing oxygen to be ionically conducted through the composite membrane under a partial pressure gradient driving force as described previously.

Alternatively, porous electrodes can be applied to the surface of the mixed oxide ionic conductor and short circuited externally to complete the electronic circuit for an oxygen partial pressure driven process. Another method, which is particularly useful to separate oxygen from mixtures containing relatively low partial pressures of oxygen, is to apply an external electric potential between the porous electrodes connected to the surface of the oxygen ionically conducting mixed oxide. The externally applied potential supplies and removes electrons from the surface and drives the oxygen ionic current, producing a separated oxygen stream at a higher partial pressure via the Nernst effect. Typical oxygen ion conductivities for multicomponent oxides of this type range from 0.01 ohm$^{-1}$cm$^{-1}$ to 100 ohm$^{-1}$cm$^{-1}$.

Another category of multicomponent metallic oxides exhibit primarily or solely electronic conductivity at elevated temperatures and their ionic transport numbers are close to zero. An example is $Pr_xIn_yO_z$ which is described in European Patent Application EP 0,399,833 A1. Such materials may be used in a composite membrane with a separate oxygen ionic conducting phase such as a stabilized $Zr_2O_3$. A membrane constructed from a composite of this type may also be used to separate oxygen from an oxygen-containing stream such as air by applying an oxygen partial pressure gradient as the driving force. Typically, the multicomponent oxide electronic conductor is placed in intimate contact with an oxygen ionic conductor.

The next steps of the process comprise establishing a positive oxygen partial pressure difference between the first and second gas compartments by producing an excess oxygen partial pressure in the first compartment and/or by producing a reduced oxygen partial pressure in the second gas compartment and contacting the oxygen-containing gaseous mixture with the ion transport membrane at a process temperature ranging from 650° C. to 800° C. to separate the compressed oxygen-containing gaseous mixture into an oxygen permeate stream and an oxygen-depleted gaseous stream and recovering the oxygen permeate stream until such time as the permeance drops to a predetermined level.

As will be seen in the Figures, oxygen permeance of the subject membranes undergoes a significant decrease when the membranes are contacted at elevated temperature, but below the critical temperature disclosed, i.e., above about 810° C., with carbon dioxide, water or hydrocarbons contained in the oxygen-containing gaseous mixture. The separation process is continued until the permeance of the gas separation membrane decreases to a point wherein economic considerations require restoration of the membrane permeance. The point at which membrane permeance should be restored will depend upon the particular membrane used in the process as well as the amount of carbon dioxide, water or hydrocarbons present in the feedstock. The process can be programmed so that membrane permeance is restored when permeance decreases to a predetermined value, on a periodic time basis, i.e., hourly, daily or weekly, or randomly depending upon the particular requirements of a given separation plant.

A difference in oxygen partial pressure between the first and second compartments provides the driving force for effecting the separation when the process temperature is elevated to a sufficient temperature to cause oxygen in the oxygen-containing gaseous mixture residing in the first compartment to adsorb, become ionized via the membrane and to be transported through the membrane in the ionic form. A pure oxygen product is collected in the second gas compartment wherein ionic oxygen is converted into the neutral form by the release of electrons in the second gas compartment which resides at lower oxygen partial pressures than the first gas compartment.

A positive oxygen partial pressure difference between the first and second gas compartments can be created by compressing air in the first compartment to a pressure sufficient to recover the oxygen permeate stream at a pressure of greater than or equal to about one atmosphere. Typical pressures range from about 15 psia to about 250 psia and the optimum pressure will vary depending upon the amount of oxygen in the oxygen-containing gaseous mixture. Conventional compressors can be utilized to achieve the compression required to practice the present step of the process. Alternately, a positive oxygen partial pressure difference between the first and second gas compartments can be achieved by evacuating the second gas compartment to a pressure sufficient to recover the oxygen permeate.

A migration of oxygen ions from the oxygen-rich side to the oxygen-deficient side of the membrane and a migration of electrons in the opposite direction takes place in the ion transport membrane. Thus, the membranes according to the present invention shall be referred to as ion transport membranes. Accordingly, only oxygen selectively permeates electrochemically through the ion transport membrane and oxygen gas having a high purity can be obtained in the second gas compartment which resides at a lower oxygen partial pressure than the first gas compartment.

The oxygen-containing permeate stream is conveniently recovered by storing the substantially pure oxygen in a suitable container or transferring the same to another process. The oxygen permeate typically comprises pure oxygen or high purity oxygen defined as a gas generally containing at least about 90 vol. % $O_2$, preferably more than about 95 vol % $O_2$ and especially more than 99 vol. % $O_2$.

When oxygen permeance of the membrane decreases to an unacceptable value, membrane permeance can be conveniently restored by raising the process temperature to a temperature greater than about 810° C. for a period of time sufficient to restore membrane permeance to a second predetermined value. The precise temperature at which this step should be conducted can be readily deduced by one of ordinary skill in the art. The restoration step is continued for a period of time until membrane permeance reaches a desirable value, i.e., the second predetermined value. The second predetermined value may be the former permeance demonstrated prior to the degradation caused by carbon dioxide, water or hydrocarbons, or any desired permeance value. Typically, membrane permeance can be restored in from 1 to 24 hours.

The process is run in a continuous manner by conducting the separation until the membrane permeance decreases to an undesirable level at which time the process temperature is raised to a temperature above about 810° C. for a time sufficient to restore membrane permeance. This process represents a significant improvement in that the separation process does not have to be interrupted in order to desorb contaminants from the membrane. Additionally, significant energy savings are realized by operating the process at lower temperatures until such time as the process temperature must be raised to restore membrane permeance.

The following examples are provided to further illustrate Applicants' claimed process. Such examples are illustrative and are not intended to limit the scope of the appended claims.

EXAMPLE 1

PREPARATION OF MULTICOMPONENT METALLIC OXIDE POWDERS

The multicomponent metallic oxides of the present invention can be conveniently prepared by calcining a mixture of the particular metal salts in air to produce the desired multicomponent metallic oxide. The metal salts are hygroscopic and must be weighed in a nitrogen purged glove box. The metal salts used were iron nitrate, cobalt nitrate, cobalt acetate, copper acetate, lanthanum acetate, lanthanum nitrate, strontium acetate, strontium nitrate, barium acetate and barium nitrate.

The stoichiometry of desired final metal oxide compound was determined in order to assess the amounts of metals salts to be used. Each metal salt was individually weighed in a nitrogen purged glove box. Distilled water was then heated in a glass dish on a hot plate and the respective metal salts were added thereto. If the particular multicomponent oxide contained iron nitrate, then the iron nitrate was added last to the water solution with each metal salt being fully dissolved before adding the next salt. Additional water was added as needed.

The resulting aqueous mixture of metal salts was stirred with a magnetic stir bar to mix the solution. After the salts were dissolved, hot plate temperature was increased until the solution boiled. Boiling was continued under agitation until the solution was nearly dry causing the metal salts to precipitate. The nearly dry solution was removed from hot plate and placed in a 120° C. oven to finish drying. The dried mixed salts were removed from the drying dish and ground with a mortar and pestle until a fine powder was obtained.

The resulting powder was placed in a zirconia crucible or boat and calcined by ramping at 1° C./min. to 250° C., and holding the temperature for 5 hours. The temperature was then ramped at 5° C./min. Finally, the powders were ground in a mortar and pestle and sieved on a 400 mesh screen.

EXAMPLE 2

PREPARATION OF SINTERED PELLET OF MULTICOMPONENT METALLIC OXIDE POWDERS

The membranes presented in the specification were prepared in the form of disks, approximately ⅜ inches in diameter and less than 2 mm thick. Pellets of the multicomponent metallic oxide powders prepared according to Example 1 were pressed with force of 20,000 lbs for 3 to 10 minutes. Dies used were either tool steel or graphite and had a diameter of 0.95 inches. Binders were occasionally used to hold the green pellet together. Either 600 or 3400 molecular weight polyethylene glycol, in a concentration of 3–5 weight percent was mixed with the powder by dissolving the binder in methanol and adding the powder to the binder solution. The resulting slurry was dried in air with occasional stirring.

The pressed pellets were placed on setters made of zirconia insulation, chosen for its low thermal mass and high porosity. Sintered pellets of the same composition as the green pellets were placed between the zirconia and the green pellets to prevent possible interaction between the setter and pellets to be sintered. The sintering schedule varied with the composition used and whether or not a binder was used. In the absence of a binder, the pellets were ramped at 20° C./min. to the sintering temperature, held for 5 hours and cooled at 1° C. to room temperature.

The preferred binder burnout and sintering schedule for $La_{0.2}Ba_{0.8}Co_{0.8}Fe_{0.2}O_{2.6}$ is summarized as follows:

1. Ramp temperature at 1° C./min. to 125° C. Hold at 125° C. for 1 hour;
2. Ramp temperature at 1° C./min from 125° C. to 150° C. Hold at 150° C. for 1 hour;
3. Ramp temperature at 1° C./min. from 150° C. to 175° C. Hold at 175° C. for 1 hour;
4. Ramp temperature at 1° C./min. from 175° C. to 200° C. Hold at 200° C. for 1 hour;
5. Ramp temperature at 1° C./min. from 200° C. to 250° C. Hold at 250° C. for 1 hour;
6. Ramp temperature at 20° C./min. from 250° C. to 1100° C. Hold at 1100° C. for 5 hours; and
7. Cool to room temperature at rate of 1° C./min.

Both calcined powder and sintered pellets were characterized by x-ray diffraction. In addition, some samples were analyzed by ICP to obtain elemental analysis and depth profiled by dynamic SIMS or sputtered XPS depth profiling

EXAMPLE 3

SEPARATION OF OXYGEN FROM OXYGEN-CONTAINING GASEOUS MIXTURES USING SINTERED PELLET OF MULTICOMPONENT METALLIC OXIDE POWDERS

The pellets prepared according to Example 2 were tested utilizing a conventional testing apparatus typical of those known in the art. The membrane to be tested was sealed onto the end of an alumina tube using a Pyrex brand glass O-ring. One side of the pellet was exposed to a mixture of zero grade air (21% oxygen, 79% nitrogen and <0.5 ppm each of carbon dioxide, water and methane), supplied by Air Products and Chemicals, Inc., Allentown, Pa., mixed with controlled amounts of carbon dioxide and water, while the other side of the pellet was exposed to UHP helium or UHP argon. Air or nitrogen flow rates could be varied between 0 and 1000 sccm and argon and helium flow rates could be varied up to 5000 sccm. The oxygen content of the oxygen permeate stream exiting the apparatus was measured with a Teledyne oxygen analyzer and a portion of the oxygen permeate stream was sent to a Spectramass Dataquad mass spectrometer in order to detect and measure the presence of leaks in the membrane.

The oxygen-containing gaseous mixture to be separated containing carbon dioxide and water consisted of APCI zero grade air at a flow rate of 930 sccm mixed with either 10,500 ppm carbon dioxide in $N_2$, or 1.5% carbon dioxide in zero grade air. Humidification of the gas was accomplished by bubbling the air through water at room temperature. The measured dew point of the air was 20°-21° C.

FIGS. 1, 2 and 3 illustrate the effect of carbon dioxide and water in the air feed on oxygen permeation rate through a disc of $La_{0.2}Ba_{0.8}Co_{0.8}Fe_{0.2}O_{3-x}$ at three progressively lower temperatures.

FIG. 1 illustrates that the oxygen flux is unaffected by exposure to carbon dioxide at a temperature of 834° C. Dry zero grade air was used initially as the air feed for 24 hours during which the oxygen flux remained constant at 1.40 sccm/cm$^2$. When 633 ppm of carbon dioxide was added to the air feed, the oxygen flux remained constant over a further 24 hours of continuous exposure. An additional experiment confirmed that at 837° C., the oxygen flux through the membrane was unaffected by continuous exposure for 80 hours to an air feed containing 2% water and 439 ppm of carbon dioxide.

FIG. 2 illustrates a similar experiment carried out at 808° C. With dry carbon dioxide-free air, the oxygen flux was constant at this temperature at 1.32 sccm/cm$^2$ over a twelve hour period. With the addition of 633 ppm of carbon dioxide in the air feed, the oxygen flux through the membrane decreased over a further two days of continuous use by 15% to 1.12 sccm/cm$^2$. This shows that the oxygen flux through this material is adversely affected by the presence of carbon dioxide at 808° C.

FIG. 3 illustrates the effect of carbon dioxide on oxygen flux at 783° C. With a dry, carbon dioxide-free air feed, the oxygen flux remained constant within experimental error over a period of 20 hours at about 1.1 sccm/cm$^2$. After adding 430 ppm of carbon dioxide to the dry air feed, the oxygen flux steadily decreased over a further period of 20 hours to about 1.0 sccm/cm$^2$. With the addition of 2% water and 430 ppm carbon dioxide to the air feed, the oxygen flux decreased over a further three day period of continuous use to 0.8 sccm/cm$^2$. The oxygen flux remained at this value when the carbon dioxide and water were removed from the air feed at 783° C. While continuously contacting the feed side of the membrane with dry carbon dioxide-free air and without interrupting the permeation of oxygen through the membrane, the temperature was raised at 1° C./min to 825° C., held for a further 16 hours at 825° C., and then cooled at 1° C./min back down to 781° C. With zero grade air as the feed, the oxygen flux returned to a constant value of about 1.1 sccm/cm$^2$. This demonstrates that the deleterious effects of carbon dioxide and water on the oxygen flux observed at 783° C. may be reversed by heating the membrane for a comparatively short time to $\geq$825° C. and returning to the original lower temperature, while continuously maintaining an oxygen flux through the membrane. The oxygen flux cannot be restored to its former higher flux value merely by removing the carbon dioxide and/or water from the air feed at the lower temperature of 783° C.

The Figures demonstrate the numerous advantages achieved by the present process compared to prior art processes. Particularly, operating costs are substantially reduced by running the process at reduced temperatures until permeance decreases to an undesirable level at which time the process temperature is elevated for a limited time to restore membrane permeance.

Having thus described the present invention, what is now deemed appropriate for Letter Patent is set forth in the Following claims.

We claim:

1. A process for restoring permeance of an ion transport membrane utilized to recover oxygen from an oxygen-containing gaseous mixture containing one or more components selected from water, carbon dioxide or a volatile hydrocarbon, the process which comprises the steps of:
   (a) delivering the oxygen-containing gaseous mixture into a first gas compartment which is separated from a second gas compartment by an ion transport membrane comprising a multicomponent metallic oxide;
   (b) establishing a positive oxygen partial pressure difference between the first and second gas compartments by producing an excess oxygen partial pressure in the first gas compartment and/or by producing a reduced oxygen partial pressure in the second gas compartment;
   (c) contacting the oxygen-containing gaseous mixture with the ion transport membrane at a process temperature ranging from 650° C. to 800° C. to separate the oxygen-containing gaseous mixture into an oxygen permeate stream and an oxygen-depleted gaseous stream and recovering the oxygen permeate stream until such time as the permeance drops to a predetermined value;
   (d) raising the process temperature to a temperature greater than about 810° C. for a period of time sufficient to restore membrane permeance to a second predetermined value; and
   (e) repeating steps (c) and (d).

2. The process according to claim 1 wherein the oxygen-containing gaseous mixture is air.

3. The process according to claim 2 wherein the positive oxygen partial pressure difference is obtained by compressing air in the first gas compartment to a pressure sufficient to recover the oxygen permeate stream at a pressure of greater than or equal to about one atmosphere.

4. The process according to claim 3 wherein the pressure in the first gas compartment required to recover the oxygen permeate stream ranges from 15 to 250 psia.

5. The process according to claim 2 wherein the positive oxygen partial pressure difference is obtained by evacuating the second gas compartment to a pressure sufficient to recover the oxygen permeate stream.

6. The process according to claim 1 where the multicomponent metallic oxide demonstrates oxygen ionic conductivity and electronic conductivity.

7. The process according to claim 6 wherein the multicomponent metallic oxide demonstrates an oxygen ionic conductivity ranging from 0.01 ohm$^{-1}$ cm$^{-1}$ to 100 ohm$^{-1}$ cm$^{-1}$ and an electronic ranging from about 1 ohm$^{-1}$ cm$^{-1}$ to 100 ohm$^{-1}$ cm$^{-1}$.

8. The process according to claim 1 wherein the ion transport membrane comprises a multicomponent oxide electronic conductor which is placed in intimate contact with an oxygen ionic conductor.

9. The process according to claim 1 wherein the ion transport membrane comprises a multicomponent metallic oxide oxygen ionic conductor which is placed in intimate contact with an electronic conductor.

10. The process according to claim 1 wherein the ion transport membrane comprises a multicomponent metallic oxide demonstrating oxygen ionic conductivity wherein external electrodes are attached to the multicomponent metallic oxide and an electrical potential is applied across the electrodes.

11. The process according to claim 10 wherein the ion transport membrane possesses an ionic conductivity ranging from 0.01 ohm$^{-1}$ cm$^{-1}$ to 100 ohm$^{-1}$ cm$^{-1}$.

12. A process for recovering oxygen from an oxygen-containing gaseous mixture containing one or more components selected from water, carbon dioxide or a volatile hydrocarbon, the process which comprises the steps of:

(a) delivering the oxygen-containing gaseous mixture into a first gas compartment which is separated from a second gas compartment by an ion transport membrane comprising a multicomponent metallic oxide represented by $A_xA'_{x'}A''_{x''}B_yB'_{y'}B''_{y''}O_{3-z}$, where A and A'' are independently selected from the group consisting of the elements of Groups 1, 2 and 3 and the F block lanthanides; A' is selected from calcium, barium, strontium or magnesium and B, B' and B'' are chosen from the D block transition metals according to the Periodic Table of the Elements adopted by the IUPAC wherein $0 \leq x'' \leq 1$, $0 < x' \leq 1$, $0 \leq x \leq 1$, $0 < y \leq 1$, $0 \leq y' \leq 1$, $0 \leq y'' \leq 1$, $x+x'+x''=1$, $y+y'+y''=1$ and z is a number which renders the composition charge neutral;

(b) establishing a positive oxygen partial pressure difference between the first and second gas compartments by producing an excess oxygen partial pressure in the first gas compartment and/or by producing a reduced oxygen partial pressure in the second gas compartment;

(c) contacting the oxygen-containing gaseous mixture with the ion transport membrane at a temperature less than about 810° C. to separate the oxygen-containing gaseous mixture into an oxygen permeate stream and an oxygen-depleted gaseous stream and recovering the oxygen permeate stream until such time as the permeance drops to a predetermined value;

(d) raising the process temperature to a temperature greater than about 810° C. for a period of time sufficient to restore membrane permeance to a second predetermined value; and (e) repeating steps (c) and (d).

13. The process according to claim 12 wherein the oxygen-containing gaseous mixture is air.

14. The process according to claim 13 wherein the positive oxygen partial pressure difference is obtained by compressing air in the first gas compartment to a pressure sufficient to recover the oxygen permeate stream at a pressure of greater than or equal to about one atmosphere.

15. The process according to claim 14 wherein the pressure in the first gas compartment required to recover the oxygen permeate stream ranges from 15 to 250 psia.

16. The process according to claim 13 wherein the positive oxygen partial pressure difference is obtained by evacuating the second gas compartment to a pressure sufficient to recover the oxygen permeate stream.

17. The process according to claim 12 where the multicomponent metallic oxide demonstrates oxygen ionic conductivity and electronic conductivity.

18. The process according to claim 17 wherein the multicomponent metallic oxide demonstrates an oxygen ionic conductivity ranging from 0.01 ohm$^{-1}$ cm$^{-1}$ to 100 ohm$^{-1}$ cm$^{-1}$ and an electronic conductivity ranging from about 1 ohm$^{-1}$ cm$^{-1}$ to 100 ohm$^{-1}$ cm$^{-1}$.

19. The process according to claim 12 wherein the ion transport membrane comprises a multicomponent oxide electronic conductor which is placed in intimate contact with an oxygen ionic conductor.

20. The process according to claim 12 wherein the ion transport membrane comprises a multicomponent oxide oxygen ionic conductor which is placed in intimate contact with an electronic conductor.

21. The process according to claim 12 wherein the ion transport membrane comprises a multicomponent oxide demonstrating oxygen ionic conductivity wherein external electrodes are attached to the multicomponent oxide capable of applying an electrical potential across the membrane.

22. The process according to claim 21 wherein the ion transport membrane possesses an oxygen ionic conductivity ranging from 0.01 ohm$^{-1}$ cm$^{-1}$ to 100 ohm$^{-1}$ cm$^{-1}$.

23. The process according to claim 12 wherein the multicomponent metallic oxide is represented by the composition $La_{0.2}Ba_{0.8}Co_{0.8}Fe_{0.2}O_{3-z}$ wherein z is a number which renders the composition charge neutral.

24. The process according to claim 12 wherein the multicomponent metallic core is represented by the composition $Pr_{0.2}Ba_{0.8}Co_{0.8}Fe_{0.2}O_{3-z}$ wherein z is a number which renders the composition charge neutral.

25. The process according to claim 12 wherein the multicomponent metallic oxide is represented by the composition $La_{0.2}Ba_{0.8}Co_{0.6}Cu_{0.2}Fe_{0.2}O_{3-z}$ wherein z is a number which renders the composition charge neutral.

* * * * *